(12) United States Patent
Levine et al.

(10) Patent No.: US 8,550,114 B2
(45) Date of Patent: Oct. 8, 2013

(54) TIME REMAINING DISPLAY ASSEMBLY

(76) Inventors: Wilton Cahn Levine, Needham, MA (US); Mark Alan Deshur, Highland Park, IL (US)

( * ) Notice: Subject to any disclaimer, the term of this patent is extended or adjusted under 35 U.S.C. 154(b) by 134 days.

(21) Appl. No.: 13/252,413

(22) Filed: Oct. 4, 2011

(65) Prior Publication Data

US 2012/0080103 A1 Apr. 5, 2012

Related U.S. Application Data

(60) Provisional application No. 61/404,481, filed on Oct. 4, 2010.

(51) Int. Cl.
*F16K 37/00* (2006.01)
*F17D 3/00* (2006.01)

(52) U.S. Cl.
USPC .................. 137/552.7; 137/552; 137/557

(58) Field of Classification Search
USPC ................ 137/551, 552, 552.7, 557; 73/700
See application file for complete search history.

(56) References Cited

U.S. PATENT DOCUMENTS

| | | | |
|---|---|---|---|
| 4,655,246 A | 4/1987 | Phlipot et al. | |
| 4,665,911 A | 5/1987 | Williams et al. | |
| 5,769,417 A | 6/1998 | Richer et al. | |
| 6,082,396 A | 7/2000 | Davidson | |
| 6,209,579 B1 * | 4/2001 | Bowden et al. | 137/557 |
| 6,244,540 B1 | 6/2001 | Stabile et al. | |
| 6,427,690 B1 | 8/2002 | McCombs et al. | |
| 6,543,444 B1 | 4/2003 | Lewis | |
| 6,986,350 B2 | 1/2006 | Zaiser et al. | |
| 7,255,127 B2 * | 8/2007 | Davidson | 137/495 |
| 2003/0189492 A1 | 10/2003 | Harvie | |
| 2007/0164040 A1 | 7/2007 | DeRosier et al. | |
| 2008/0150739 A1 | 6/2008 | Gamard | |
| 2010/0097232 A1 | 4/2010 | Lee et al. | |

OTHER PUBLICATIONS

International Search Report of the International Searching Authority corresponding to International Application No. PCT/US2011/054732 mailed Jan. 30, 2012.
Written Opinion of the International Searching Authority corresponding to International Application No. PCT/US2011/054732 mailed Jan. 30, 2012.

* cited by examiner

*Primary Examiner* — John Rivell
*Assistant Examiner* — Michael R Reid
(74) *Attorney, Agent, or Firm* — Amster Rothstein & Ebenstein LLP (57) ABSTRACT

A time remaining display assembly for indicating the time remaining in a pressurized gas tank, adapted to be connected to a regulator having a flow rate adjuster for selecting one of a plurality of flow rate settings comprising an assembly coupled to the flow rate adjuster, the assembly having one or more time scales imprinted thereon, each time scale corresponding to one of the flow rate settings, each time scale indicating the time remaining in the tank as a function of gas pressure in the tank.

16 Claims, 6 Drawing Sheets

TIME REMAINING DISPLAY ASSEMBLY

CROSS-REFERENCE TO RELATED APPLICATIONS

This application claims priority to U.S. Provisional Patent Application No. 61/404,481, filed Oct. 4, 2010, the content of which is incorporated herein by reference as if set forth herein in its entirety.

FIELD

The present disclosure relates generally to display assemblies for a gas regulator, and more specifically, to a display assembly for displaying an amount of time remaining in a source of pressurized gas, such as a pressurized gas tank.

BACKGROUND

The exemplary embodiments discussed herein use the example of an oxygen regulator as an illustrative embodiment. Oxygen regulators are generally used to regulate the amount of oxygen supplied to patients who depend on an oxygen supply aid, such as an oxygen tank. Current oxygen regulator gauges express the contents of an oxygen cylinder in terms of pressure, generally measured in pound-force per square inch (PSI), and flow rate, generally measured in liters per minute (l/min). While this information is useful, clinicians generally need to know the time remaining in an oxygen tank so that a new tank can be provided with appropriate planning to ensure safe care of a patient. However, many users of the oxygen tanks are not aware of the method or mathematics required to perform the conversion for a given tank volume from pressure (i.e., PSI) and flow (i.e., liters per minute) into time remaining (i.e., minutes) of oxygen.

For example, presently, when clinicians or other personnel transport patients, a desired flow rate is set and the pressure must be checked to verify that enough oxygen is in a tank to reach the transport destination, including any possible delays. The amount of time remaining is not displayed on the tanks, and therefore transport personnel must be able to make a calculation for a given tank volume from PSI to liters remaining and then divide by the flow rate to obtain the minutes of oxygen remaining in the tank at that flow rate, which typically ranges from 0-15 liters/minute. For a standard E-cylinder, the amount of time in minutes at a given gauge pressure and flow rate in l/min may be calculated with a straightforward calculation. This calculation, when performed and performed accurately, can enable the transport personnel to calculate the remaining minutes of oxygen flow in the tank. What is lacking in the prior art, however, is an improved display assembly that also displays the time remaining until the tank is empty, which is suitable for use with flow regulators. If an oxygen tank runs empty, poor patient outcomes may occur, such as hypoxemia, hypercarbia, and the related consequences.

SUMMARY

In exemplary embodiments, a time remaining display assembly is provided for indicating the time remaining in a pressurized gas tank, adapted to be connected to a regulator having a flow rate adjuster for selecting one of a plurality of flow rate settings. The time remaining display can comprise an assembly coupled to the flow rate adjuster, the assembly having one or more time scales imprinted thereon, each time scale corresponding to one of the flow rate settings, each time scale indicating the time remaining in the tank as a function of gas pressure in the tank.

In exemplary embodiments, a regulator is provided having a flow rate adjuster for selecting one of a plurality of flow rate settings. The regulator can comprise a time remaining display assembly coupled to the flow rate adjuster, the assembly having one or more time scales imprinted thereon, each time scale corresponding to one of the flow rate settings, each time scale indicating the time remaining in the tank as a function of gas pressure in the tank.

In exemplary embodiments, a time remaining display assembly is provided for indicating the time remaining in a pressurized gas tank having a pressure gauge and a flow rate adjuster for setting a flow rate. The time remaining display assembly can comprise a computer processor operatively coupled with the pressure gauge and the flow rate adjuster, the computer processor being configured to receive a flow rate indication from the flow rate adjuster; receive a pressure indication from the pressure gauge; and calculate an amount of time remaining based upon the flow rate indication, the pressure indication, and one or more parameters relating to the size of a tank; and a display screen adapted to display the amount of time remaining.

While regulators may have flow rates between 0.25-30 liters/minute, in exemplary embodiments, regulators that have both lower and higher flow rate limits may be used with exemplary embodiments. While exemplary embodiments are described with reference to a standard oxygen E-cylinder herein, this is in no way meant to be limiting. In exemplary embodiments, any type and/or size of container, cylinder, and/or tank adapted to contain any type of gas may be used.

Other features and advantages of the present invention will become readily apparent from the following detailed description, the accompanying drawings and the appended claims.

BRIEF DESCRIPTION OF THE DRAWINGS

The features and advantages of embodiments of the present invention will be more fully understood with reference to the following detailed description when taken in conjunction with the accompanying figures, wherein.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). Similarly, the words "include," "including," and "includes" can mean including but not limited to. To facilitate understanding, like reference numerals have been used, where possible, to designate like elements common to the figures.

DETAILED DESCRIPTION

The present disclosure relates generally to a time remaining display assembly for a gas regulator that displays, as a function of flow rate and tank size, an amount of time remaining in a pressurized gas tank, such as an oxygen tank. Exemplary embodiments can be provided as a separate assembly that can mechanically connect to a regulator, an assembly that is integral with a regulator, and/or an assembly that uses a central processing unit ("CPU"), to name a few. In exemplary embodiments, a scale of time remaining values may be imprinted or otherwise displayed on a portion of time remaining display assembly operatively connected to a flow rate adjuster of a standard regulator, e.g., a regulator for an oxygen E-cylinder.

In exemplary embodiments, a time remaining display assembly that is adapted to mechanically connect to a regulator is provided. The time remaining display assembly may comprise, for example, a housing adapted to substantially surround a portion of a standard regulator such that the housing may be rotated about the body of the standard regulator. The housing may mirror the shape of the regulator, or may comprise a different shape. The housing may be attached to a flow rate adjuster, such as a flow rate adjustment knob, such that when the knob is rotated, the housing is rotated an equivalent amount.

In exemplary embodiments, the housing may be imprinted with time remaining scales corresponding to given flow rates selected by the flow rate adjuster. A certain scale of time remaining values may coordinate to a given flow rate. For example, a flow rate of 1 liter per minute may correspond to time remaining values of 695, 608, 521, 434, 348, 261, 174, 87, and 0 minutes, depending on the amount of gas remaining in the tank. The values and scales provided herein are for exemplary purposes and are in no way meant to be limiting. For example, the any number of values provided herein may be modified to conform to standard time remaining calculations. Further, any number of time points may be provided on any scale. By way of example, the time remaining scale may comprise 1-30 time points. In the example provided above, nine time points may be used, however more or less time points may be used in accordance with exemplary embodiments.

Figure 2:
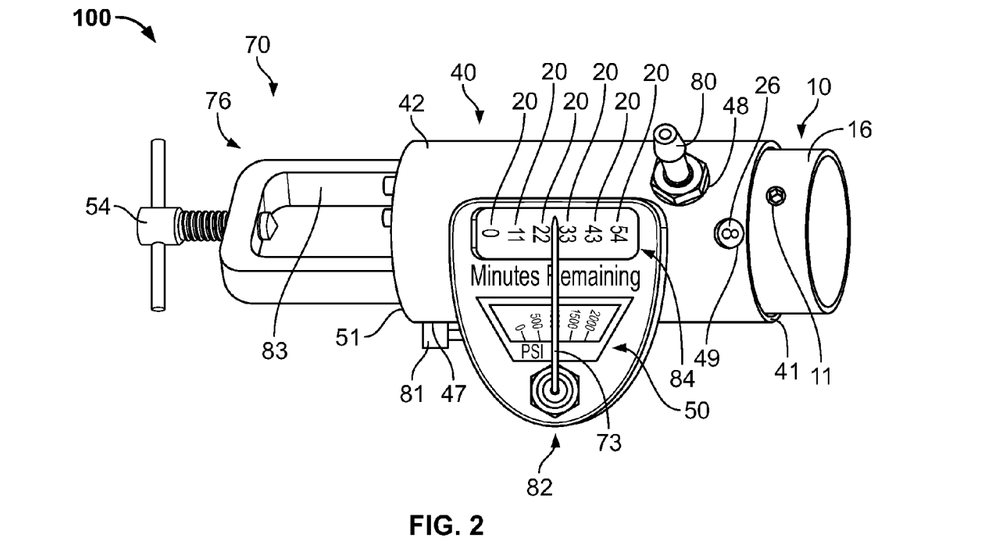
FIG. 2 is a perspective view of a time remaining display assembly and regulator in accordance with exemplary embodiments.
Figure 3:
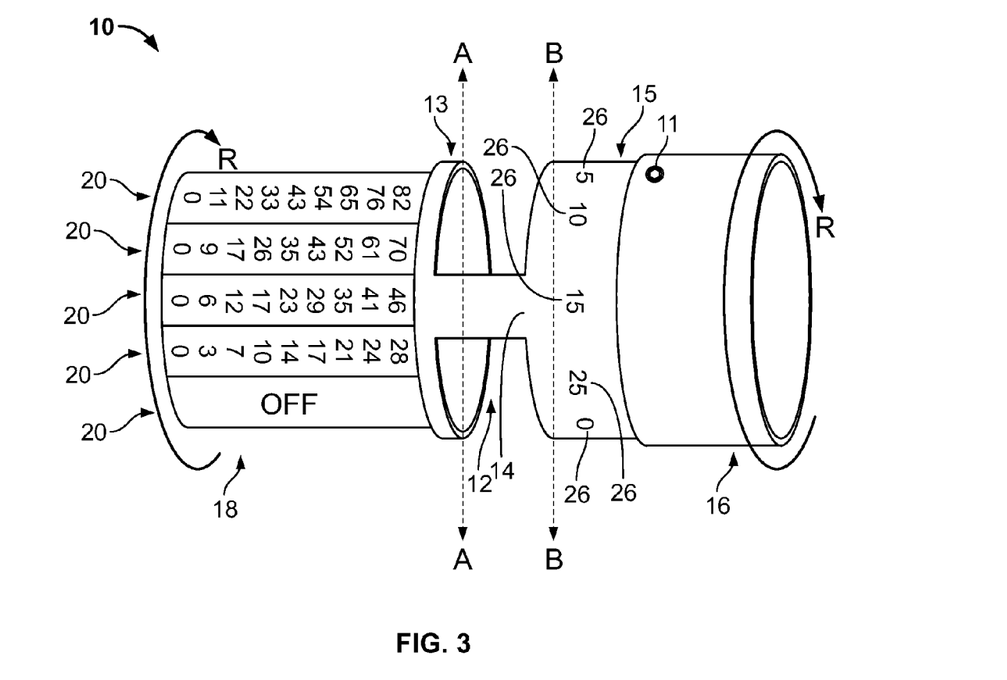
FIG. 3 is a perspective view of an inner housing in accordance with exemplary embodiments.

A pressure gauge can also be attached to the regulator. The pressure gauge may comprise a needle or other indicator of sufficient length to overlap the time remaining values. As the pressure gauge reads the pressure in a tank, the gauge is adapted to move the needle or indicator across the time remaining values and indicate a remaining time value for a given pressure. Each of the time remaining values may correspond to a given pressure at a given flow rate. With reference to FIG. 2, described in greater detail below, when an inner cylinder 10 is rotated, the attached flow rate adjustment knob (not shown) is also rotated, increasing or decreasing the flow rate of a compressed gas in a tank. The flow rate indicator 26 may be displayed in an aperture 49. For example, in FIG. 2, a flow rate "8" is displayed in the aperture 49. In this example, the flow rate 8 corresponds to time remaining values 20. The specific time remaining values depicted in FIG. 2 and FIG. 3 are meant to be for illustrative purposes only and are generally not accurately calibrated as depicted.

In exemplary embodiments, the time remaining values 20 or any scales referred to herein can be calibrated to known calculations relating to gas properties, pressure, flow rate, tank size, and time remaining such that an accurate estimated amount of time remaining can be displayed. In exemplary embodiments, a substantially linear relationship may exist between an amount of time remaining and an amount of pressure in a tank containing a compressed gas such as oxygen. By way of example, one or more formulas for calculating a time remaining in a tank may produce values reflected in the following example Tables 1 and 2, which indicate time remaining values for corresponding pressures and flow rates:

EXAMPLE TABLE 1

| Gas Remaining (L) | Pressure (PSI) | Time Remaining (Minutes) Flow Rate (L/m) | | | | | | | | | |
|---|---|---|---|---|---|---|---|---|---|---|---|
| | | 0.25 | 0.5 | 1 | 2 | 3 | 4 | 8 | 10 | 15 | 25 |
| 695 | 2000 | 2780 | 1390 | 695 | 348 | 232 | 174 | 87 | 70 | 46 | 28 |
| 608.125 | 1750 | 2433 | 1216 | 608 | 304 | 203 | 152 | 76 | 61 | 41 | 24 |
| 521.25 | 1500 | 2085 | 1043 | 521 | 261 | 174 | 130 | 65 | 52 | 35 | 21 |
| 434.375 | 1250 | 1738 | 869 | 434 | 217 | 145 | 109 | 54 | 43 | 29 | 17 |
| 347.5 | 1000 | 1390 | 695 | 348 | 174 | 116 | 87 | 43 | 35 | 23 | 14 |
| 260.625 | 750 | 1043 | 521 | 261 | 130 | 87 | 65 | 33 | 26 | 17 | 10 |
| 173.75 | 500 | 695 | 348 | 174 | 87 | 58 | 43 | 22 | 17 | 12 | 7 |
| 86.875 | 250 | 348 | 174 | 87 | 43 | 29 | 22 | 11 | 9 | 6 | 3 |
| 0 | 0 | 0 | 0 | 0 | 0 | 0 | 0 | 0 | 0 | 0 | 0 |

EXAMPLE TABLE 2

| Gas Remaining (L) | Pressure (PSI) | Time Remaining (Minutes) Flow Rate (L/m) | | | | | | | | | |
|---|---|---|---|---|---|---|---|---|---|---|---|
| | | 0.25 | 0.5 | 1 | 2 | 3 | 4 | 8 | 10 | 15 | 25 |
| 695 | 2000 | 2780 | 1390 | 695 | 348 | 232 | 174 | 87 | 70 | 46 | 28 |
| 556 | 1600 | 2224 | 1112 | 556 | 278 | 185 | 139 | 70 | 56 | 37 | 22 |
| 417 | 1200 | 1668 | 834 | 417 | 209 | 139 | 104 | 52 | 42 | 28 | 17 |

EXAMPLE TABLE 2-continued

| Gas Remaining (L) | Pressure (PSI) | Time Remaining (Minutes) Flow Rate (L/m) | | | | | | | | |
|---|---|---|---|---|---|---|---|---|---|---|
| | | 0.25 | 0.5 | 1 | 2 | 3 | 4 | 8 | 10 | 15 | 25 |
| 278 | 800 | 1112 | 556 | 278 | 139 | 93 | 70 | 35 | 28 | 19 | 11 |
| 139 | 400 | 556 | 278 | 139 | 70 | 46 | 35 | 17 | 14 | 9 | 6 |
| 0 | 0 | 0 | 0 | 0 | 0 | 0 | 0 | 0 | 0 | 0 | 0 |

The pressure gauge 82 may be adapted to measure the pressure of a compressed gas in an attached tank (not shown), such that when the pressure in the tank decreases, the needle indicates a lower pressure in a pressure scale 50. For example, as depicted in FIG. 2, the needle 73 may be configured to move to the left as pressure in the tank decreases. When a lower pressure is indicated on the pressure gauge, a corresponding lower time measurement may be displayed. For example, as depicted in FIG. 2. a pressure reading on the pressure scale displaying pressure values 50 is overlapped by the needle 73, and a corresponding time measurement 20 is displayed in the window 84. As the pressure in the tank decreases, the needle 73 may move, such that a lower pressure value 50 may be indicated and a corresponding lower time remaining value 20 may be indicated.

In operation, when the flow rate adjustment knob is rotated, different time scales may be displayed in a given orientation and/or through a window. For example, a user may rotate the cylinder and increase or decrease the flow rate by turning the inner housing 10. As the knob is rotated and the flow rate changes, a different scale may displayed in the window wherein the different scale corresponds with the new flow rate. Although pictured herein as adapted to couple with standard regulators, the time remaining display may be adapted to fit any regulator for compressed gas tanks. In alternative embodiments, in addition to an inner housing 10, the time remaining display assembly 100 may further comprise an outer housing 40. The outer housing may be adapted to cover the inner housing, such that only one set of time remaining values/scale can be viewed at a time through a window.

As depicted in FIG. 3, when the outer housing 40 is not used in conjunction with the inner housing 10, every series of time remaining values/scales may be viewable. In alternative embodiments, the pressure gauge may comprise a window 84 therein allowing the time remaining values to be viewed through the window 84. The window may be disposed on top of the inner housing 10, or alternatively, on top of a window 44 in the outer housing.

Figure 7:
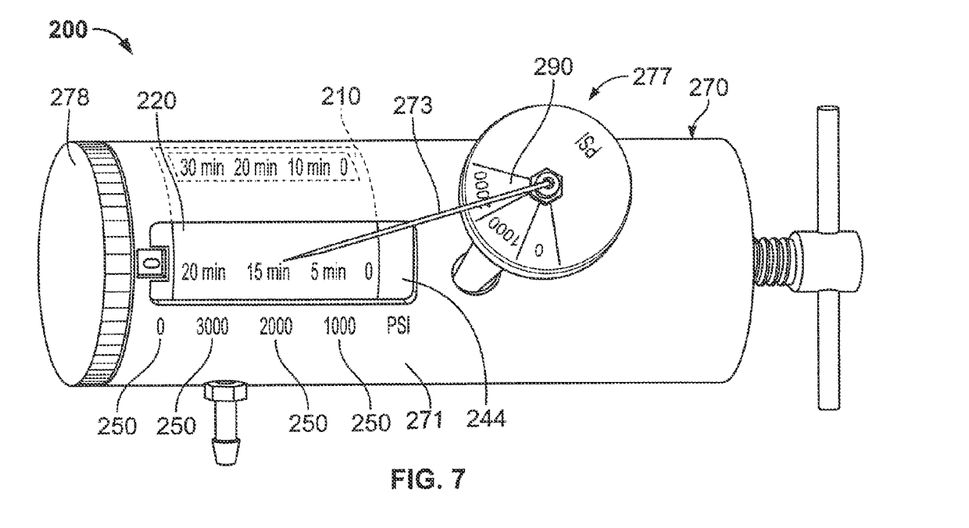
FIG. 7 is a perspective view of a regulator in accordance with exemplary embodiments.

In alternative embodiments, the time remaining display assembly 100 may be integral with the regulator (See FIG. 7) such that the time remaining values are displayed within the regulator. With reference to FIG. 7, although an indicator 273 is depicted as overlapping a time remaining value 220, in alternative exemplary embodiments the indicator 273 need not overlap the values. For example, in alternative exemplary embodiments, a floating ball or internal meter (not shown) may be present to indicate the pressure and time level. In exemplary embodiments, the floating ball or internal meter may be disposed vertically, horizontally, or in any feasible orientation such that it indicates a pressure and a corresponding time remaining in a tank.

Figure 8:
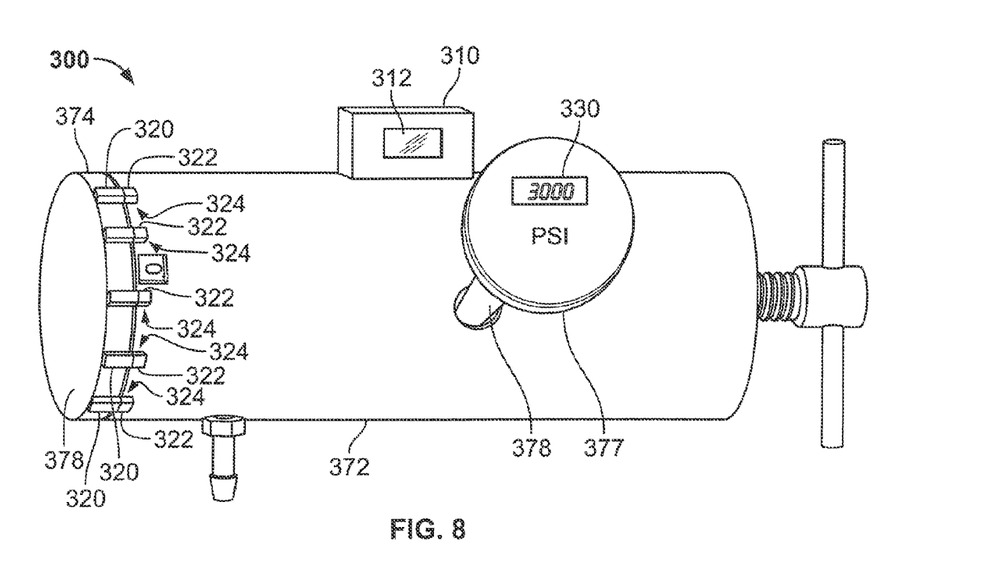
FIG. 8 is a perspective view of a regulator in accordance with exemplary embodiments.

In further alternative embodiments, a CPU may be used to calculate time remaining values (See FIG. 8). Although depicted in FIG. 3-5 as including a pressure gauge comprising an indicator, e.g., a needle, in exemplary embodiments, alternative types of pressure gauges may be used. For example, a digital pressure gauge or a pressure gauge that does not require the use of a needle may be used. In exemplary embodiments, the time remaining display assembly 100 may be adapted to couple to any type of standard regulator and/or pressure gauge.

A scale of time values can be displayed on a surface that is operatively coupled with a flow rate adjuster, such as the rotatable knob commonly used for E-cylinders. In exemplary embodiments, an amount of pressurized gas will be depleted faster if the regulator is set to a high flow rate in L/min. Because an amount of pressurized gas depletes faster if the regulator is set to a higher flow rate in L/min, the time remaining scale values are calculated and calibrated to correspond to each flow rate.

Current pressurized gas tanks and flow regulators do not indicate the time remaining in a particular tank or group of tanks. Instead, the flow regulators typically include a pressure gauge for measuring pressure in the pressurized gas tank. A determination of the time remaining in a pressurized gas tank generally requires a manual calculation involving the volume of the tank, the flow rate of the gas, and the pressure in the tank. Typically, to calculate a time remaining in a pressurized gas tank, a user must perform a mathematical conversion using known formulas. Performing such manual calculations may result in loss of critical time, especially in cases where patients rely on the compressed gas. In addition, performing manual calculations, especially when users are unaware of the correct formula to use, may substantially increase the likelihood of an error. When errors are made in the medical field, the results may negatively affect the health of patients.

The present disclosure relates to an apparatus that can obviate the need for time-consuming manual time calculations by displaying the amount of time remaining in a pressurized gas tank. The present disclosure relates to an assembly that can be adapted to attach to an existing regulator, or can be formed integral with the regulator. An exemplary apparatus can couple to an assembly adapted to display time values calibrated to flow rates to a flow rate adjuster, such as a knob on a regulator. In exemplary embodiments, the time display apparatus may comprise a series of time values printed on a surface. The surface may be integral with the regulator or may be a separate assembly adapted to couple with and/or fit over the regulator. The time values may correspond to time remaining in a pressurized tank.

Standard E-cylinder regulators can include a flow rate adjustment knob for allowing a user to control the flow of the pressurized gas by selecting on of a plurality of flow rates. In exemplary embodiments, the display apparatus may be coupled with the flow rate adjustment knob, such that when a particular flow rate is selected, the remaining corresponding time scale as a function of cylinder pressure will be displayed.

The present disclosure includes a time display apparatus adapted to operatively couple one or more time remaining scales with a flow regulator, such that when a flow regulator is actuated, an appropriate time scale is displayed. Each time scale can include calculated values of time remaining as a function of the amount of pressure in a tank. When an appropriate time scale is displayed, an indicator coupled to the pressure gauge may be operatively arranged to overlap the scale, such that the indicator points to time remaining at that pressure.

For example, a series of time remaining time values can range from smaller time values corresponding to lower pressure readings to larger time values corresponding to higher pressure readings. As pressure decreases, the indicator will move across a scale and show a lower amount of time remaining. In exemplary embodiments, both the time remaining and the pressure of the tank may be displayed simultaneously.

Although described herein as a tank, the source of the pressurized gas may include any source consistent with exemplary embodiments of the present disclosure. By way of example, the source of the pressurized gas may include a pressurized container, cylinder, and/or other suitable vessel. Although depicted as including an inner housing 10 and an outer housing 40, exemplary embodiments may include any assembly coupled with the flow rate adjuster 78.

As used herein, the term "pressurized container" may include any type of container adapted to contain a pressurized gas and/or source of pressurized gas, for example, an oxygen E-cylinder. As used herein, the term "E-cylinder" refers to a gas cylinder of the size most commonly used in the United States to store oxygen for individual patient delivery. An E-cylinder can be color-coded green for quick recognition as oxygen. As used herein, the term "pressurized gas" may include a liquid at a temperature lower than the saturation temperature at a given pressure.

For convenience, many of the exemplary embodiments presented herein are described with respect to an oxygen E-cylinder and oxygen regulator therefor. Alternative types of compressed or pressurized gas containers, and/or regulators are contemplated within the scope of the present disclosure. Although many of the exemplary embodiments are described with respect to oxygen, exemplary embodiments of the present disclosure can be used to monitor any type of pressurized gas.

Exemplary embodiments of the present disclosure can include a display assembly that may be adapted to attach to and/or couple with existing gas regulators to display a time remaining until a source of gas is depleted. Alternative exemplary embodiments of the present disclosure can include a display assembly that is integral with a gas regulator to display a time remaining until a source of gas is depleted. Further, exemplary embodiments of the present disclosure can include a mechanical and/or electrical display and/or components. In exemplary embodiments, an electrical display can be adapted to be operatively coupled with a computer processor.

Exemplary embodiments of the present disclosure can provide a user with an amount of time remaining until a pressurized gas container is depleted. The amount of time remaining is related to the pressure in a pressurized container and a flow rate. Display assemblies in accordance with exemplary embodiments may be adapted to an existing pressurized gas regulator to display both the pressure remaining and the time remaining in a pressurized gas cylinder. Exemplary display assemblies may include mechanical and/or electrical components. In exemplary embodiments, a display assembly can be adapted to couple with one or more standard oxygen E-cylinder regulators and/or flow-meters.

Exemplary embodiments of the present disclosure can make clinicians or other users aware of the time remaining until an oxygen tank used for patient transport runs empty by conveniently displaying this information for the user. One benefit of making users aware of the time remaining can be improving patient safety in hospitals, nursing homes and any location where oxygen cylinders are used by patients. Exemplary embodiments of the present disclosure can reduce or remove the need for personnel to convert minutes and flow into time and can provide a color scheme that can notify users when less than a designated amount of time remains in a tank, for example, less than thirty minutes.

Exemplary embodiments of the present disclosure can include a mechanical solution that can be added to an existing oxygen regulator to enhance usability and patient safety. Because exemplary embodiments of the present disclosure can be strictly mechanical, failure modes may be minimized, because power may not be necessary. A display assembly in accordance with the present disclosure can be added to or replace all oxygen E-cylinder regulators worldwide. Many hospitals, nursing homes and users of oxygen E-cylinders may benefit from the time display assembly in accordance with the present disclosure.

In exemplary embodiments, an apparatus for displaying the amount of time remaining in a pressurized container within which a fluid can be flowed is provided. The apparatus may be implemented by disposing first indicia, which represent time remaining values, and second indicia, which can represent fluid pressure values, on a flow rate control mechanism in an operative relationship based on predetermined calculations. The calculations relate to pressure, flow rate and/or duration of flow for a contained, pressurized fluid of known volume. In exemplary embodiments, when the flow mechanism is actuated, the amount of time remaining in the pressured container can be displayed. The corresponding time values for a given flow rate can be pre-calculated and written and/or imprinted on an assembly such that for a given flow rate, the pressure and time may be indicated. In exemplary embodiments, the time remaining calculations are pre-calculated and printed such that times and pressures overlap for a given flow rate.

In exemplary embodiments, an apparatus for displaying the amount of time remaining in a pressurized container can include electronically processing inputs related to flow rate and pressure of a fluid in a pressurized container to calculate the time remaining at a particular flow rate. The calculations can relate to pressure, flow rate and/or duration of flow for a contained, pressurized fluid of known volume to generate an output that can relate to the time remaining in the pressured container. In exemplary embodiments, the output can be displayed and/or transmitted to a user and/or a device configured to receive data transmissions.

The aforementioned advantages of the exemplary embodiments will become apparent in light of the following descriptions.

Exemplary Time Display Assembly

Figure 1:
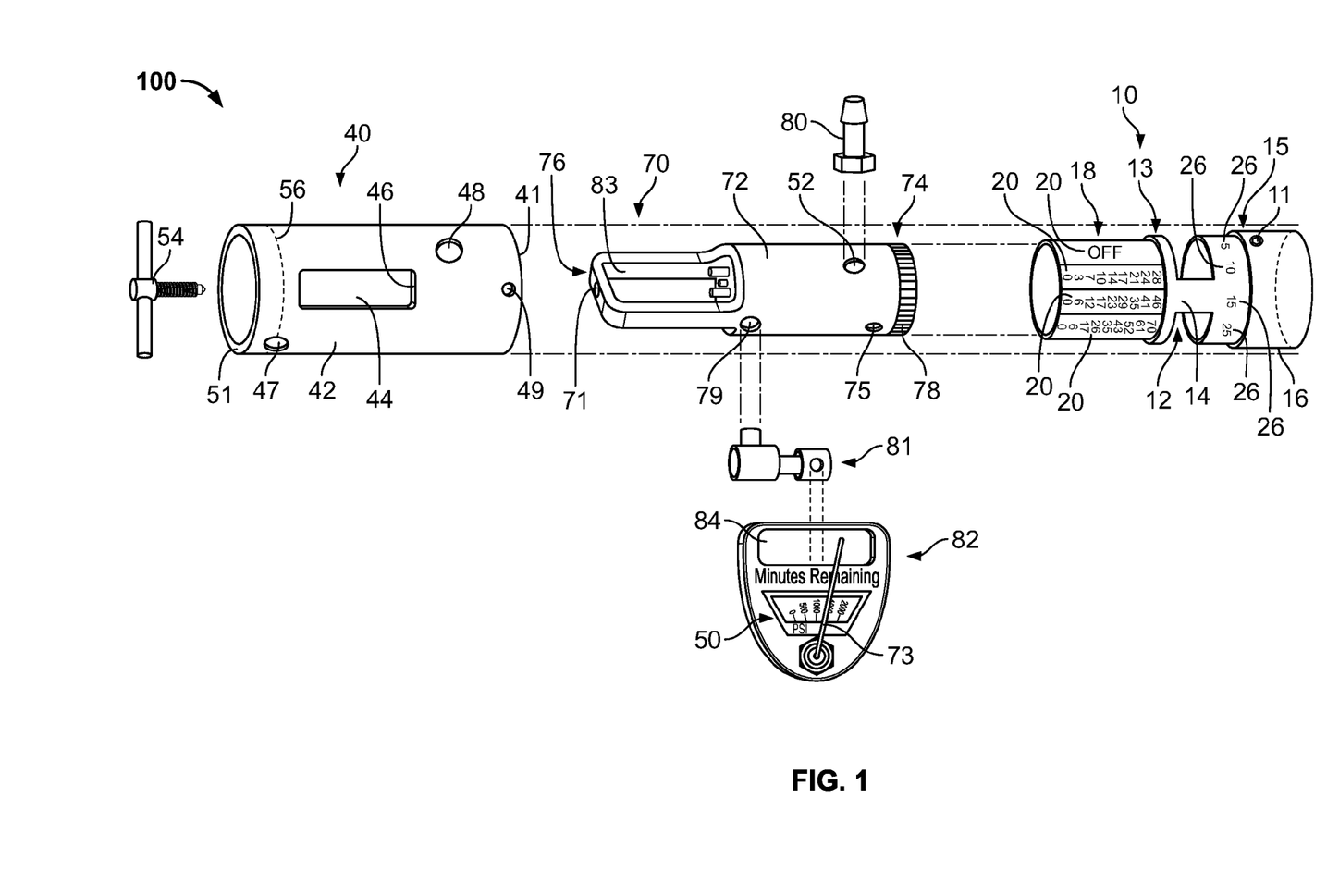
FIG. 1 is an exploded view of a time remaining display assembly and regulator in accordance with exemplary embodiments.

FIG. 1 is an exploded view of a display assembly 100 in accordance with one of the exemplary embodiments. In exemplary embodiments, a display assembly 100 may be adapted to couple with a regulator 70. The regulator 70 may be a standard regulator, e.g., for use with an oxygen E-cylinder. The display assembly 100 may be releasable attachable to the regulator, or can be integral with the regulator (See FIG. 8).

In exemplary embodiments, the time display assembly 100 can be adapted to display the amount of time remaining in a pressurized container within which a fluid and/or pressurized gas is flowed. The time display assembly 100 can include an outer housing 40, a regulator 70, an inner housing 10, and/or a gauge assembly 82. Although the outer housing 40, regulator 70, and inner housing 10 are depicted in FIGS. 1-8 in a generally cylindrical and/or rounded shape, any shape feasible may be used.

The outer housing 40 may include a leading edge portion 41, a first aperture 47, a second aperture 48, a third aperture 49, a wall 42, a display aperture 44, a leading window edge portion 46, an interior lip 56 and/or a trailing edge portion 51. The outer housing 40 may include a substantially hollow interior and/or inner region surrounded by the wall 42. The outer housing 40 may be sized proportionately in relation to the regulator 70 and the inner housing 10, such that the inner housing 10 and the regulator 70 may fit within the wall 42. In exemplary embodiments, when the inner housing 10 is fit within the wall, the proximal portion 18 may enter the leading edge portion 41 until the proximal portion is stopped by the interior lip 56. In alternative embodiments, an inner lip 56 is not present. An exemplary outer housing is described with reference to FIG. 4.

The regulator 70 may include a first end 74, a second end 76, an attachment screw aperture 71, an attachment screw 54, a housing 72, a yoke attachment 83, a port 79, a conduit aperture 52, a flow rate scale 75, a flow rate adjuster 78, a fluid flow conduit 80, and/or a pipe 81. The regulator 70 may include any regulator adapted to regulate the flow of a compressed gas. By way of example, a regulator 70 may be a standard oxygen regulator adapted for an E-cylinder. An exemplary regulator 70 is described with reference to FIG. 5.

The pipe 81 may be adapted to couple with the port 79 and the gauge assembly 82. The gauge assembly 82 may include a window 84, fluid pressure values 50, and a needle 73. While a needle 73 is depicted, any indicator adapted to point at and/or overlap an indication may be used. The gauge assembly 82 may include indicia relating to pressure in a pressurized tank, in terms of PSI, and/or indicia relating to a time remaining. The window 84 should be of a size substantially similar to the display aperture 44 of the outer housing 40, such that time values 20 may be viewed through the display aperture 44 and the window 84 when the window 84 of the gauge assembly 82 is disposed over the display aperture 44. An exemplary gauge assembly 82 is described with reference to FIG. 2.

The inner housing 10 may include a distal portion 16, a proximal portion 18, time values 20, an opening 12, a bridge 14, one or more flow indicators 26, a first lip 13, a second lip 15, and/or a bore 11. The inner housing 10 may include a substantially hollow interior and/or inner region surrounded by a wall. The inner housing 10 may be sized proportionately in relation to the regulator 70 and the outer housing 40, such that the at least a portion of regulator 70 may fit within the wall of the inner housing 10, and at least a portion of the inner housing 10 may fit within the wall 42 of the outer housing 40. An exemplary inner housing 10 is described with reference to FIG. 3.

FIG. 1 is an exploded view of a display assembly 100 in a disassembled configuration, in accordance with exemplary embodiments. FIG. 2 is a perspective view of a display assembly 100 in an assembled configuration, in accordance with exemplary embodiments. With reference to FIGS. 1 and 2, the time remaining display assembly 100 may be converted from a disassembled configuration (See FIG. 1) to an assembled configuration (See FIG. 2). Although the regulator 70 is depicted in FIG. 1 in a generally disassembled form, the regulator 70 may be assembled prior to assembling the time display assembly 100.

If the conduit 80, the pipe 81, and/or the attachment screw 54 are attached to the regulator 70, the conduit 80, the pipe 81, and/or the attachment screw 54 can be attached from the regulator 70. The first end 74 of the regulator 70 can then be inserted through an opening in the proximal portion 18 of the inner housing 10 until the first end 74 reaches the distal portion 16 of the inner housing 10. In exemplary embodiments, the distal portion 16 may include an inner lip (not shown) that can be formed on the interior surface of the distal portion 16. If an inner lip is formed in the distal portion 16, the first end 74 of the regulator 70 can be inserted through an opening in the proximal portion 18 until the first end 74 reaches and is adjacent to the inner lip. The first end 74 can be inserted into the distal portion 16 in such a manner as to allow the conduit aperture 52 to be substantially aligned and in registration with the opening 12 of the inner housing 10. The first end 74 can be inserted into the distal portion 16 in such a manner as to allow the flow rate adjuster 78 to be in alignment with the distal portion 16.

A pin, e.g., a threaded fastener, rivet, etc. (not shown), can be used to join at least a portion of the flow rate adjustment knob 78 to the inner housing 10 by urging the pin through the bore 11 and into and/or adjacent at least a portion of the flow rate adjustment knob 78. In an alternative embodiment, the bore 11 may not be present, and at least a portion of the distal portion 16 of the inner housing 10 can be frictionally fit and secured to at least a portion of the flow rate adjustment knob 78.

Figure 4:
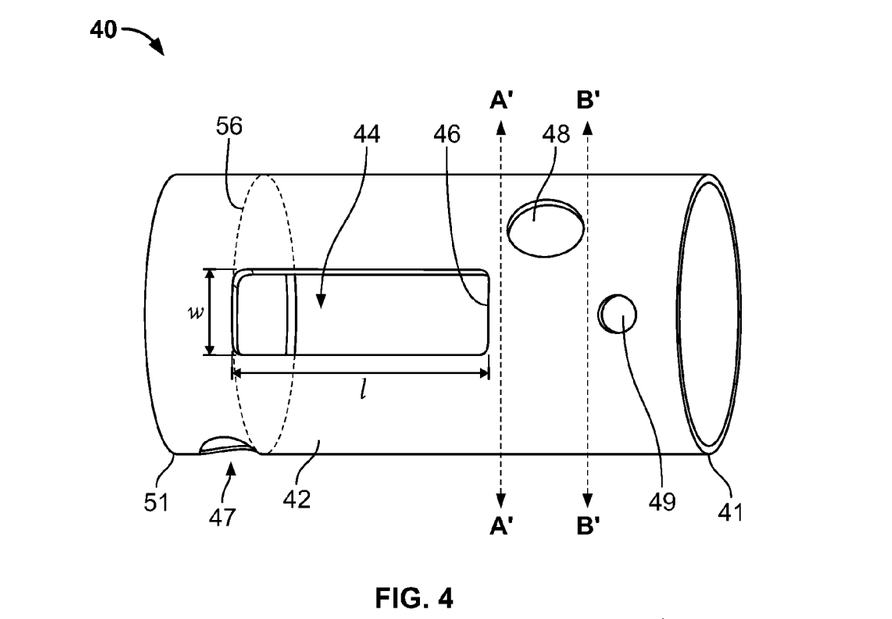
FIG. 4 is a perspective view of an outer housing in accordance with exemplary embodiments.

Following the joining of the flow rate adjustment knob 78 to the inner housing 10, the proximal portion 18 of the inner housing 10 can be inserted into the outer housing 40 until the leading edge portion 41 of the outer housing 40 extends beyond the opening 12 of the inner housing 10, the second aperture 48 is aligned and/or in registration with the opening 12, and/or the conduit aperture 52, the first aperture 47 is aligned and/or in registration with the port 79, the leading window edge portion 46 of the display aperture 44 can extend beyond the time values 20 such that at least one of the time values 20 can be viewed through the display aperture 44. With reference to FIGS. 3 and 4, in exemplary embodiments, the proximal portion 18 of the inner housing 10 can be inserted into the outer housing 40 until lines A-A and B-B of inner housing 10 are in positional agreement with lines A'-A' and B'-B' of outer housing 40.

Referring back to FIGS. 1 and 2, the pipe 81, and/or an alternative type of pipe, can be fitted through the first aperture 47 and the port 79 to couple the pipe 81, and/or alternative type of pipe, with the regulator 70. The conduit 80 can be fitted through the second aperture 48, the opening 12, and/or the conduit aperture 52 to couple the conduit 80 with the regulator 70. By coupling the pipe 81 and/or the conduit 80 as described above, the inner housing 10 and/or outer housing 40 can be secured to the regulator 70. (See FIG. 2). In exemplary embodiments, other methods of securing the inner housing 10 and/or the outer housing 40 to the regulator 70 and/or each other can be used. For example, adhesives, welding, friction fitting, and/or any other attachment and/or coupling method may be used.

The gauge assembly 82 may be coupled with the pipe 81, such that the window 84 of the gauge assembly 82 may be aligned and/or registered with the display aperture 44 of the outer housing 40, such that the time values 20 may be viewed through the display aperture 44 of the outer housing 40 and the window 84 of the gauge assembly 82. The time display assembly may be attached to a pressurized container (not shown) and/or other source of a pressurized gas. For example, the attachment screw 54 may be attached and secured in the attachment screw aperture 71, thereby securing the pressurized container and/or other source of the pressurized gas to the time display assembly. The first aperture 47, the second aperture 48, and/or the third aperture 49 may not be present.

With reference to FIGS. 1-4, in operation, the inner housing 10 can be rotated in the direction of arrows R. By way of example, the inner housing 10 can be rotated in the direction of arrows R by grasping and rotating the distal portion 16 of the inner housing 10. In exemplary embodiments, when the distal portion 16 is rotated, a resultant torque can rotate the flow rate adjustment knob 78 which can in turn modulate the flow of gas and/or liquid through the regulator 70 and provide for the presentation of a particular time scale 20 through the display aperture 44 of outer housing 40. Stepped rotation of the distal portion 16 and the flow rate adjustment knob 78 can allow a user to know and control the flow rate of the fluid. In exemplary embodiments, a flow rate can be displayed and selected in accordance with one or more flow indicators 26 that can be displayed on the inner housing 10. (See FIG. 3).

With reference to FIG. 2, upon rotating the distal portion 16 such that the fluid begins to flow in through the regulator 70 and out to through the conduit 80, a user may view the indicator on the gauge assembly 82 to determine pressure 50 in the gas tank. The gauge assembly 82 may include a needle 73, which may point to a particular fluid pressure value 50 that corresponds to the pressure in the tank and a time remaining value 20 that corresponds to the time remaining based on the flow rate value 26 and tank pressure. In exemplary embodiments, the flow rate value 26 may be displayed on the distal portion 16 of the inner housing. (See FIG. 3), such that the flow rate value 26 may be visible through the third aperture 49 of the outer housing.

With reference to FIGS. 1-4, the time remaining values 20 and the pressure values 50 can be positioned in operative relationship. In exemplary embodiments, the needle 73 can overlap a time remaining value 20 which can indicate the time remaining at a pressure by viewing the corresponding time remaining value 20, thereby obviating the need of the user of the device to perform a manual calculation to determine the time remaining value 20.

In operation, the inner housing 10 can be placed over the regulator 70 with a conduit 80 and pipe 81 attached and/or unattached to the regulator 70 and/or the inner housing 10. The inner housing 10 can be secured to the regulator 70 by urging a pin or attachment member through the bore 11 and/or at least a portion of the regulator 70 can be frictionally fit in the inner housing 10. In exemplary embodiments inner housing 10 can be aligned to allow the flow rate scale 75 to be viewed through the opening 12, and/or through the third aperture 49. The outer housing 40 can be placed and positioned to allow at least one of the time values 20 to be viewed through the display aperture 44. The conduit 80 and/or pipe 81 can then be attached and/or secured.

The pressure values 50 can be positioned on the gauge assembly 82 and/or on the outer housing 40. The gauge assembly 82 can include a window 84 and/or first indicia. By way of example, the first indicia can indicate time values. The time values can indicate an amount of time remaining until a source of a compressed gas is depleted. The time values can correspond to a given flow rate and a given pressure. The first indicia may be disposed on the regulator 70, the inner housing 10, the outer housing 50, and/or the gauge assembly 82. A second indicia, which can represent fluid pressure values, can also be disposed on the regulator 70, the inner housing 10, the outer housing 50, and/or the gauge assembly 82. The first and second indicia can be positioned in operative relationship based on calculations. The calculations can relate to pressure, flow rate, and duration of flow for a contained pressurized fluid of known volume. In exemplary embodiments, the time display assembly 100 can include a needle 73 that can be secured to the gauge assembly 82. The needle 73 can indicate to the user the amount of time remaining in a pressurized container. In exemplary embodiments, the inner housing 10 can be adapted for attachment and/or coupling to the regulator 70. A first indicia can be presented on the inner housing 10. By way of example, the first indicia can represent time values. In exemplary embodiments, the outer housing 40 can be configured and arranged to receive the inner housing 10 and can include second indicia. The second indicia can represent fluid pressure values 50.

The needle 73 can be used to indicate the time remaining in the tank by overlapping one or more indicia for providing both the pressure remaining in the tank and the time remaining in the tank. In exemplary embodiments, the time remaining can be color-coded. For example, if greater than 60 minutes remain, the indicator can be colored green. If 30-60 minutes remain, the indicator can be colored yellow and if less than 30 minutes remain, the indicator can be red. In exemplary embodiments, any color can be used to indicate any specific time remaining or range of times remaining. Further, in exemplary embodiments, alerts can be set to indicate any specific time remaining or any range of times remaining. For example, the color red and/or an alert may be used when less than 45 minutes remain in a tank, less than 30 minutes remain in a tank, less than 20 minutes remain in a tank, less than 15 minutes remain in a tank, or the like. An alert may comprise any mechanical and/or electrical alert. The alert may include, for example, an audible and/or visual alert. For example, an alert may comprise a beep, a flashing light, and/or an electronic data transmission to a receiving device, and/or the like.

Referring again to FIG. 2, in the attachment screw 54, yoke attachment 83, trailing edge portion 51, first aperture 47, pipe 81, gauge assembly 82, needle 73, fluid pressure values 50, window 84, third aperture 49, leading edge portion 41, bore 11, distal portion 16, inner housing 10, conduit 80, second aperture 48, time values 20, wall 42, regulator 70, and/or second end 76 can be similar to the corresponding elements described with respect to FIG. 1.

In addition, the attachment screw 54 may include any securing member adapted to secure a regulator to a source of a compressed gas. For example, the attachment screw 54 may include a securing member adapted to secure the yoke of an oxygen cylinder (not shown) through passed through a yoke attachment 83. The yoke attachment 83 may include any attachment member adapted couple with a source of compressed gas.

Trailing edge portion 51 and/or leading edge portion 41 may include an edge of any feasible shape. For example, the edge may include a flat edge, a curved edge, and/or a jagged edge, to name a few. In exemplary embodiments, the first aperture 47, second aperture 48, and/or third aperture 49 may include any feasible size and shape. By way of example, the first aperture 47, second aperture 48, and/or third aperture 49 may include a circle, square, rectangle, triangle, parallelogram, pentagon, hexagon, oval, to name a few.

The pipe 81 may include any pipe adapted to direct a flow of compressed gas. The pipe 81 can include one or more pieces (See FIG. 6). The pipe 81 can include any material feasible in exemplary embodiments. In exemplary embodiments, the gauge assembly 82 may include a needle 73 and a pressure gauge. The gauge assembly 82 may include a surface upon which the window 84 is formed. In exemplary embodiments, the surface may not be included. The surface may include any shape, for example, circle, square, rectangle, triangle, parallelogram, pentagon, hexagon, oval, to name a few.

Needle 73 may include any indicator adapted to point or overlap an indication in response to a force, such as pressure. The pressure values 50 can be included at various calibrated intervals. For example, the pressure values 50 may include a measurement for 0 PSI, 500 PSI, 1000 PSI, 1500 PSI, and/or 2000 PSI, to name a few. The window 84 can include any aperture adapted overlap one or more time values 20. The time values 30 may include one or more indications at selected intervals corresponding to a given flow rate and a given pressure. For example, time values 20 that correspond to a flow rate indicated by a flow rate indicator 26 may include a number of minutes between 0-3000 presented at intervals calibrated one or more flow rates from ¼-25 liters per minute and one or more pressure measurements from 0-2000 PSI. The ranges presented herein are meant to be for exemplary purposes and are not meant to limit the scope of the disclosure. In exemplary embodiments, any feasible range may be used.

The bore 11 may be threaded and adapted to couple with a tightening screw (no shown) and or may not be threaded and adapted to accept a pin, or the like. In exemplary embodiments, although one bore 11 is depicted, any feasible number of bores may be used. Distal portion 18 and/or the proximal portion 16 may include any feasible length and thickness. For example, the distal portion 18 may include a shorter length and greater thickness than the proximal portion 16.

The conduit 80 may include any conduit adapted to direct the flow of a pressurized and/or compressed gas. The wall 42 may include any material. For example, the wall may include aluminum. In exemplary embodiments, the regulator 70 may include any regulator adapted to regulate the flow of a pressurized and/or compressed gas. In exemplary embodiments, the inner housing 10, the outer housing 40, the needle 73, and the gauge assembly 82 can be adapted to functionally cooperate with each other in any feasible combination.

Actuating the inner housing 10 can in turn actuate the flow rate adjustment knob 78 of the regulator 70 to allow the fluid and/or gas to be flowed from the pressurized container at a selected flow rate. When actuated, a time remaining scale corresponding to the selected flow rate can be in registration with the window 84 and can therefore be viewable to a user. As fluid and/or gas is being flowed, the needle 73 will point to the gas pressure value and overlap the time remaining scale to show the time remaining at that particular gas pressure value. In exemplary embodiments, a user can observe the appropriate time remaining scale through the window to obtain the time remaining for fluid and/or gas flow in a pressurized container at the tank pressure and selected flow rate.

In exemplary embodiments, the inner housing 10 may be similar to the inner housing 10 described with respect to FIGS. 1 and 2. In exemplary embodiments, the inner housing 10 can include a partially circumferential opening 12, wherein the distal portion 16 and the proximal portion may be joined by a bridge 14. In exemplary embodiments, the opening 12 may be any size consistent with exemplary embodiments. By way of example, the opening 12 may be 10%, 25%, 50%, or 75% of the circumference of the inner housing 10, to name a few. A first lip 13 may be formed in the inner housing 10 such that the circumference of the outer surface of the proximal portion 18 between the first lip 13 and an inner edge portion may be less than the circumference of the outer surface of the portion of the inner housing 10 between the bridge 14 and the first lip 13. The second lip 15 may be formed in the inner housing 10 such that the circumference of the outer surface of the distal portion 16 between the second lip 15 and an outer edge portion may be less than the circumference of the outer surface of the portion of the inner housing 10 between the bridge 14 and the second lip 15. In exemplary embodiments, the bridge 14 can be adapted to act as a stopping mechanism such that when a rotation force is applied to the inner housing 10 (i.e., the inner housing 10 is actuated), the inner housing 10 may continue to rotate about the regulator 70 until the bridge 14 contacts a conduit 80 or any stopping means coupled with the regulator 70. In exemplary embodiments, the conduit 80 may be coupled with the regulator 70 at the conduit aperture 52 and may be disposed through the opening 12 and the second aperture 48 (See FIGS. 2-4).

With reference to FIG. 4, an outer housing 40 in accordance with exemplary embodiments is shown. In exemplary embodiments, the outer housing 40 may be similar to the outer housing 40 described with respect to FIGS. 1 and 2. The outer housing 40 may include a substantially hollow interior and/or inner region surrounded by a wall 42, and may include any feasible material. By way of example, the outer housing 40 may include a metal, plastic, ceramic, glass, elastomer, biopolymer, composite, wood, any material consistent with embodiments of the present disclosure, or the like. The outer housing 40 may be sized proportionately in relation to the regulator 70 and the inner housing 10, such that the inner housing 10 and the regulator 70 may fit within the wall 42.

In exemplary embodiments, the outer housing 40 may include a leading edge portion 41 and a wall 42. Disposed within at least a portion of the wall 42 can be a display aperture 44 having a length l, a width w and an leading window edge portion 46. Fluid pressure values 50 can be secured to and/or optionally integral with the wall 42 along the length l (not shown). A first aperture 47, a second aperture 48, and/or a third aperture 49 can be disposed on the wall 44. The outer housing may include materials consistent with exemplary embodiments of the present disclosure. By way of example, the outer housing 40 may include a metal, plastic, ceramic, glass, elastomer, biopolymer, composite, wood, any material consistent with embodiments of the present disclosure, or the like.

Figure 5:
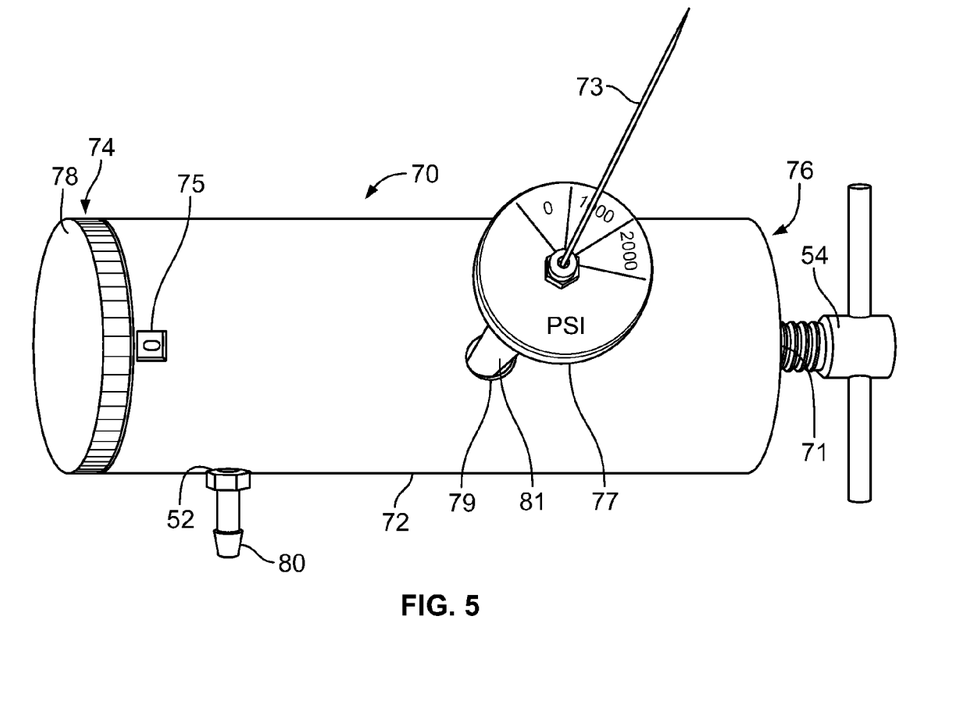
FIG. 5 is a perspective view of a regulator in accordance with exemplary embodiments.

FIG. 5 is a perspective view of regulator in accordance with exemplary embodiments. With reference to FIG. 5, a regulator 70 in accordance with exemplary embodiments a fluid, e.g. oxygen gas, regulator is shown. In exemplary embodiments, the regulator 70 may include a first end 74, a second end 76, an attachment screw aperture 71, a housing 72, a yoke attachment (not shown), a port 79, a conduit aperture 52, a flow rate scale 75, a flow rate adjuster 78, a fluid flow conduit 80, a pipe 81, and/or an attachment screw 54. The regulator 70 may include any regulator adapted to regulate the flow of a compressed gas. By way of example, a regulator 70 may be a standard oxygen regulator adapted for an E-cylinder. The regulator 70 can include a cylindrical housing 72 having a first end 74 and a second end 76. The first end 74 can include a flow rate adjuster 78, a flow rate scale 75, and a fluid flow conduit 80. A gauge 77 having a pipe 81 is attached in fluid communication to the regulator 70 through a port 79 and can be adapted to measure pressure, e.g., oxygen pressure, in a tank when the tank is attached to the regulator 70. As will be understood by those skilled in the art, rotating the flow rate adjustment knob 78 can control the flow rate of fluid that is passed through the regulator 70 and out the conduit 80. A needle 73 can be attached to the gauge 77 and may reference fluid pressure indicia disposed on the gauge 77 and is configured and arranged to overlap at least a portion of the display aperture 44 of the device. In exemplary embodiments, the flow rate scale 75 may be adapted to display a flow rate, for example, a flow rate for a pressurized gas.

With reference to FIGS. 4 and 5, the first aperture 47 can be dimensioned to allow the conduit 80 to pass therethrough. The second aperture 48 can be dimensioned to allow the pipe 81 and/or any hardware that attaches the pipe 81, e.g., extensions, to pass therethrough. A regulator 70, such as an oxygen regulator, can generally attach to the yoke of a compressed gas cylinder (not shown) and can include a control dial/flow rate adjustment knob 78 to adjust the flow rate. By way of example, a control dial/flow rate adjustment knob 78 may adjust the flow rate of the gas from 0 liters/minute to 15 liters/minute. Generally, a regulator 70 can display pressure, typically measured in PSI. For example, regulators can display pressure, from 0 PSI for an empty tank to 2000 PSI for a full tank containing approximately 650-700 liters of compressed gas, such as oxygen.

Figure 6:
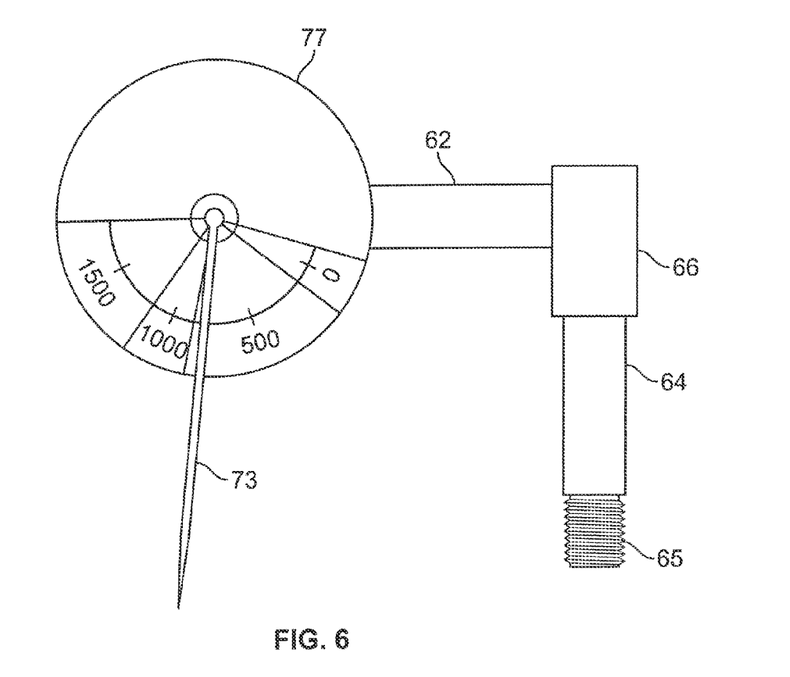
FIG. 6 is a perspective view of a pressure gauge in accordance with exemplary embodiments.

With reference to FIG. 6, an alternative embodiment of the pipe 81 of the pressure gauge 77 and/or regulator 70 is generally shown. In exemplary embodiments, the pipe 81 can include a first pipe 62 secured to a second pipe 64 by a joint 66 or, in another embodiment, a single piece (not shown). In exemplary embodiments, the end 65 of the second pipe 64 can be threaded. The second pipe 64 can be adapted to be secured in fluid communication to the port 79 (See FIG. 5), e.g., by threading the second pipe 65 through the port 79.

Exemplary Regulator with an Integral Display Assembly

FIG. 7 is a perspective view of a regulator assembly 200 with an integral display in accordance with exemplary embodiments. Like reference numerals are used in FIG. 7 for like parts shown in FIGS. 1-4. In exemplary embodiments, the regulator 270 can include a side wall 271 having pressure values 250 disposed thereon and an inner housing 210 (shown in partial phantom) that can be configured and arranged to rotate within the regulator 270. The inner housing can be connected to the flow rate adjustment knob 278. An opening 244 in the side wall 271 can be positioned to allow the user of the device to view the time values 220. As with the previously described embodiments, when the user rotates the flow rate adjustment knob 278, the needle or indicator 273 can overlap a time remaining value 220 which can indicate a time remaining for the fluid to flow through the regulator 270 at the pressure reading of the gauge 277 thereby obviating the need of the user of the device to perform a manual calculation to determine the time remaining value 220. In yet another embodiment, the gauge 277 can include pressure values 290 and the gauge 277 and the pressure values 290 can be positioned in operative relationship to the time values 250 based on known calculations relating to pressure, flow rate and duration of flow for a contained, pressurized fluid of known volume.

In exemplary embodiments, the flow rate adjustment knob 278 can be adapted for selecting one of a plurality of flow rate settings. The regulator assembly 200 can comprise a time remaining display assembly coupled to the flow rate adjustment knob 278. The display assembly can have one or more time scales 220 imprinted thereon, each time scale corresponding to one of the flow rate settings. In exemplary embodiments, each time scale 220 can be adapted to indicate the time remaining in the tank as a function of gas pressure in the tank. An aperture or window 244 can be formed in the regulator 200 such that the one or more time scales 220 are viewable through the aperture 244.

In exemplary embodiments, the regulator 200 further comprises a pressure gauge 277, wherein the time remaining is determined by a pressure indicated by the pressure gauge. In exemplary embodiments, the pressure gauge 277 has an indicator 273 operatively aligned to the time scale 220 corresponding to a selected flow rate to indicate the time remaining in the tank at a pressure 290 indicated by the pressure gauge 277. A pressure scale 250 may be imprinted in proximity to the one or more time scale 220, the pressure scale 250 indicating an amount of pressure. The one or more time scales 220 can be color-coded.

In exemplary embodiments, upon turning a flow setting dial/flow rate adjustment knob 78, a set of numbers can be displayed in addition to the pressure display. For example, the numbers may include indications of a time until the tank empties 220, 250. By way of example, the time indications can include hours, minutes, seconds, or the like. In exemplary embodiments, the time until the tank empties may be calibrated to a flow rate, such that when flow rate increases, the time indications decrease. The converse can also hold true, such that when flow rate decreases, the time indications increase.

Exemplary Electronic Regulator Display Assembly

FIG. 8 is a perspective view of a regulator assembly 300 in accordance with exemplary embodiments. Like reference numerals are used in FIG. 8 for like parts shown in FIGS. 1-4. The regulator assembly 300 can include a computer processor 310 coupled with a display screen 312, a pressure gauge 377. The computer processor 310 can be operatively coupled with the pressure gauge 377 and a flow rate adjustment knob 378. The computer processor 310 can be configured to receive a flow rate indication from the flow rate adjuster; receive a pressure indication from the pressure gauge; and calculate an amount of time remaining based upon the flow rate indication, the pressure indication, and one or more parameters relating to the size of a tank. The display screen 312 can be adapted to display the amount of time remaining. The display screen 312 can be further adapted to display at least one of the flow rate indication and the pressure indication. The display screen 312 can be further adapted to display a color-coded time remaining.

In exemplary embodiments when the amount of time remaining calculated by the computer processor 310 is below a designated threshold, the computer processor 312 may be configured to generate an alert. An alert may comprise, for example, an audible alert, a visible alert, or an electronic alert, such as a transmitted signal. In exemplary embodiments, when the amount of time remaining is below a designated threshold a siren or beep may sound; a light may flash; and/or an electronic transmission, e.g., an e-mail, SMS, MMS, instant message, or other electronic transmission, may be transmitted to a receiving device.

In exemplary embodiments, a series of magnets of different strengths 320 can be arranged on the flow rate adjustment knob 378. In exemplary embodiments, a series of magnetizable strips 322 can be arranged on the cylindrical housing 372 in a manner that can allow each magnet 320 to register with each magnetizable strip 322 when the flow rate adjustment knob 378 is rotated. When registered, each magnet 320 and each magnetizable strip 322 can form a plurality of assemblies 324. Each assembly 324 can form part of a circuit (not shown) that is broken when the assembly 324 is disassembled. As will be readily understood by those in the art, current can be passed through the circuit and measured to determine which assembly 324 has been formed based on the strength of attraction between the magnet 320 and magnetizable strip 322 of each assembly 324.

In exemplary embodiments, the processor 310 can be in communication, e.g., wired and/or wirelessly, with the circuits of each assembly 324. Thus, when current is passed through the circuit of an assembly 324 and measured, the measured value in the form of a first signal input can be received and processed by the processor to yield a flow rate value. The pressure gauge 377 can include an electronic display 330 that is configured and arranged to communicate, e.g., by wire and/or wirelessly, the pressure value of the pressurized container in the form of a second signal input to the processor 310 whereupon the processor 310 can receive and process the second signal input.

In operation, the user of the assembly 300 rotates the flow rate adjustment knob 378 of the flow rate control mechanism 374 to control the flow of fluid being passed through the cylindrical housing 372 until the desired magnet 320 registers with a magnetizable strip 322 to form an assembly 324. A first signal input can be communicated to and received by the processor 310, the second signal input can be communicated to and received by the processor 310, the processor 310 can compute the time remaining in the pressurized container based on the received first and second signal inputs and known calculations relating to pressure, flow rate and duration of flow for a contained, pressurized fluid of known volume to generate an output signal. The output signal can include a value that is representative of the time remaining in the pressurized container and the related flow rate and pressure, and is shown on the screen 312. In exemplary embodiments, any feasible means for communicating the first signal input to the processor 312 could be used other than that described above. For example, the magnets 320 could include a sole magnet designed with an escalating gradient of attraction to the magnetizable strips 322 or a sole metal. Exemplary embodiments may include any feasible modifications to the simplicity or complexity of the sensors and circuitry, e.g., the number of circuits and design of the circuits, needed to effect the generation of the first signal input. In exemplary embodiments, the assembly 300

Exemplary Alternative Regulator Display Assembly

Figure 9:
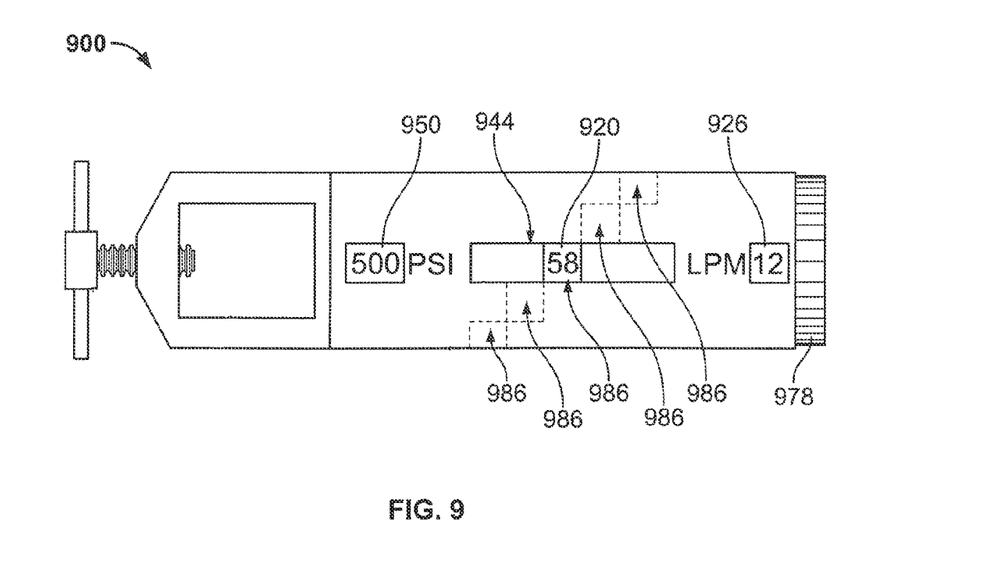
FIG. 9 is a perspective view of an alternative regulator in accordance with exemplary embodiments.

FIG. 9 is a perspective view of an alternative regulator assembly 900 in accordance with exemplary embodiments. Like reference numerals are used in FIG. 9 for like parts shown in FIGS. 1-7. In exemplary embodiments, a regulator assembly 900 may be adapted to display corresponding pressure values 950, time remaining values 920, and flow rate indications 926 simultaneously for a tank of a predetermined size. The pressure values 950 and time remaining values 920 may be imprinted on a first housing 1000 (See FIG. 10) coupled to an internal pressure gauge, such that the time remaining values 920 can be viewable through a window 944 in the regulator assembly 900. The pressure values 950 and time remaining values 920 may be positioned such that they may be viewable through both an aperture 986 on a second housing 1100 (See FIG. 11) and the window 944. The first housing 1000 may be substantially surrounded by the second housing 1100.

Figure 10:
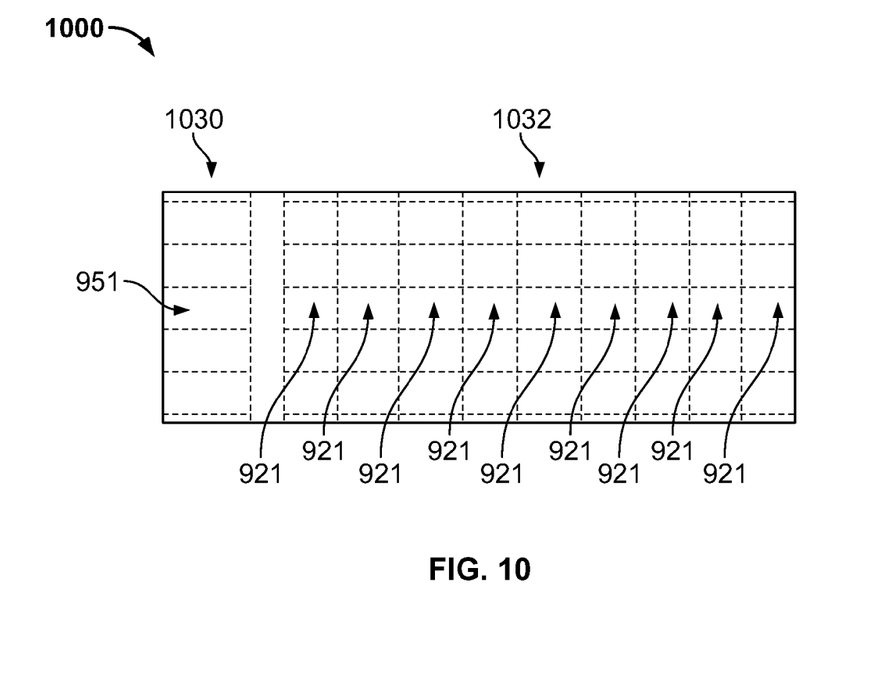
FIG. 10 is a perspective view of a first housing in accordance with exemplary embodiments.

With reference to FIG. 10, the first housing 1000 may be coupled to a pressure gauge, which may be an internal pressure gauge. The first housing 1000 may be calibrated to rotate and/or move in response to the pressure in a tank (not shown) measured by the pressure gauge. The first housing 1000 can include a pressure portion 1030 and a time remaining portion 1032. Pressure values 950 may be imprinted on the pressure portion 1030 in pressure value locations 951. Time remaining values 920 may be imprinted on the time remaining portion 1032 in time remaining value locations 921. The time remaining values 920 may correspond to pressure values 950. The time remaining values 920 may be grouped in a scale corresponding to a particular pressure value 950. As depicted in FIG. 10, one or more pressure values 950 can be imprinted in pressure value location 951 that correspond to one or more time remaining values 920 imprinted in each of the time remaining value locations 921 in a horizontal orientation. By way of example, a single pressure value 950 may correspond to nine time remaining values 920 that are viewable through the apertures 986. The apertures 986 correspond to a flow rate 926 such that a corresponding time remaining value 920 for a measured pressure value 950 may be displayed through a corresponding aperture 986. In exemplary embodiments, time remaining values 920 imprinted in time remaining value locations 921 in vertical alignment may correspond to a given flow rate.

The pressure portion 1030 can be operatively coupled to the time remaining portion 1032 such that when the pressure in the tank changes, the first housing 1000 is rotated and the pressure portion 1030 and the time remaining portion 1032 are rotated or otherwise moved a substantially equivalent amount. The pressure portion 1030 may be adapted to rotate such that a corresponding pressure value 950 may be displayed for a given pressure measurement. The first housing 1000 may comprise two detachable portions 1030, 1032 that are operatively coupled. Alternatively, the first housing 1000 may comprise a single unit comprising both a pressure portion 1030 and a time remaining portion 1032. By way of example, when the pressure in a tank attached to regulator assembly 900 decreases, the first housing 1000 may rotate such that a pressure value 950 may be displayed and a corresponding time remaining value 920 may be displayed.

Figure 11:
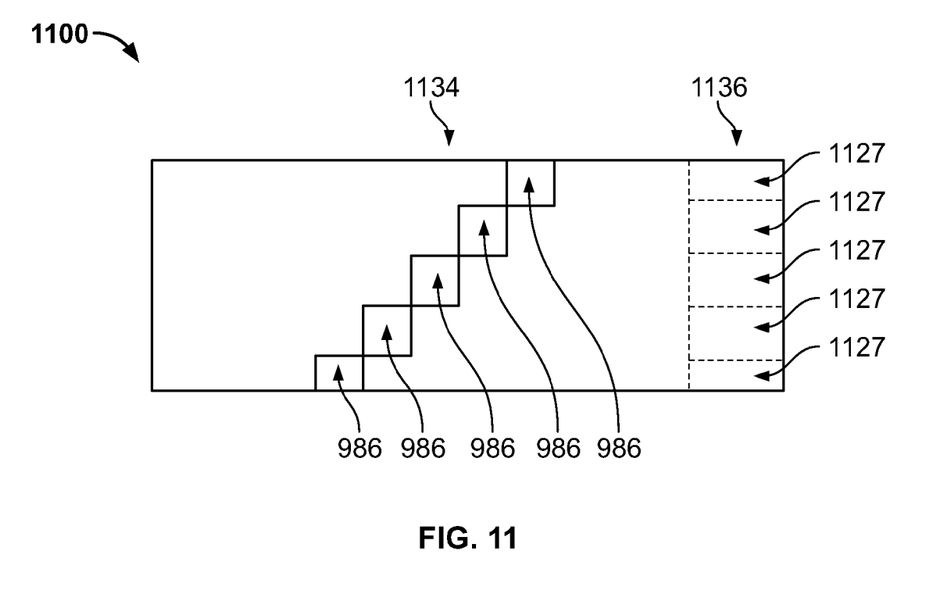
FIG. 11 is a perspective view of a second housing in accordance with exemplary embodiments.

With reference to FIG. 11, the second housing 1100 may include an aperture portion 1134 and a flow rate portion 1136. One or more apertures 986 may be formed in the aperture portion 1134. One or more flow rate indicators 926 may be imprinted in flow rate locations 1127 on the flow rate portion 1136. Although depicted in a diagonal orientation, the apertures 986 may be formed in any pattern feasible in exemplary embodiments. Although depicted in a linear orientation, the flow rate locations 1127 may be formed in any pattern feasible in exemplary embodiments. In exemplary embodiments, the flow rate locations 1127 can correspond to the apertures 986, such that time remaining values 920 for corresponding pressure values 950 may be viewed through the apertures 986. The apertures 986 may be operatively aligned with the window 944 of the regulator assembly 900, such that the time remaining values 920 may be viewed through the apertures 986 and the window 944.

The aperture portion 1134 can be operatively coupled to the flow rate portion 1136. The second housing 1100 may be operatively coupled with the flow rate adjustment knob 978 (See FIG. 9), such that when the flow rate adjustment knob 978 is actuated, the second housing 1100 may be actuated a substantially equivalent amount such that an aperture 986 is operatively aligned with the window 944 in the regulator assembly 900. The second housing 1100 may comprise two detachable portions 1134, 1136 that are operatively coupled. Alternatively, the second housing 1100 may comprise a single unit comprising both a aperture portion 1134 and a flow rate portion 1136.

Referring back to FIG. 9, in operation, the regulator assembly 900 can be attached to a tank of pressurized gas, or the like. The regulator assembly 900 can be adapted to measure a pressure in the tank, such that a pressure value 950 can be displayed. The flow rate adjustment knob 978 may be actuated to select a flow rate indicated by a flow rate indication 926. When the flow rate adjustment knob 978 is actuated, the second housing 1100 is actuated an substantially equivalent amount such that an aperture 986 corresponding to the selected flow rate is aligned with the window 944. When an aperture 986 is aligned with the window 944 a time remaining indication 920 imprinted on the first housing 1000 is displayed through the aperture 986 and the window 944. The time remaining indication 920 may correspond to an amount of pressure indicated by the pressure value 950. As a result, a user can view a pressure value 950, a corresponding time remaining value 920, and a corresponding flow rate 926 simultaneously for a tank of a predetermined size. In exemplary embodiments, the pressure value 950, time remaining value 920, and flow rate 926 may be calibrated according to known calculations, as shown, for example, in Tables 1 and 2.

Although the device has been shown and described with respect to several exemplary embodiments thereof, various changes, omissions and additions to the form and detail thereof, may be made therein, without departing from the spirit and scope of the present disclosure. For example, it is contemplated that the dimensions of the various components of the inner housing 10 and the outer housing 40 described herein and the dimensioning and placement of the time values 20 and fluid pressure values 50 can be adjusted to match the varying mechanical specifications of the regulator 70, e.g., the flow rate control flow rate adjustment knob 78 and the flow rate scale 75, and the form and style of the presented time and fluid pressure values, 20, 50 respectively, e.g., size of font, space between indicia, ranges of values, colors, etc., can be altered by preference.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

Further, it will be understood that any of the elements and/or exemplary embodiments of the invention described can be rearranged, separated, and/or combined without deviating from the scope of the invention. For ease, various elements are described, at times, separately. This is merely for ease and is in no way meant to be a limitation.

While the various steps, elements, and/or exemplary embodiments of the invention have been outlined above, it is evident that many alternatives, modifications and variations will be apparent to those skilled in the art. The various steps, elements, and/or exemplary embodiments of the invention, as set forth above, are intended to be illustrative, not limiting. Various changes may be made without departing from the spirit and scope of the invention. Accordingly, the spirit and scope of the present invention is to be construed broadly and not limited by the foregoing specification.

No element, act, or instruction used in the description of the present application should be construed as critical or essential to embodiments of the present invention unless explicitly described as such. Also, as used herein, the article "a" is intended to include one or more items. Where only one item is intended, the term "one" or similar language is used.

Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. In addition, as used herein, the term "set" is intended to include any number of items, including zero. Further, as used herein, the term "number" is intended to include any number, including zero.

What is claimed is:

1. A time remaining display assembly for indicating the time remaining to supply gas at a selected flow rate from a pressurized gas tank, said assembly adapted to be coupled to a regulator for said gas tank having a pressure gauge and a rotatable flow rate selector for selecting one of a plurality of flow rates, said assembly comprising:
    an inner rotatable housing having a cylindrical configuration configured to be mounted over at least a portion of said regulator and to be coupled to the rotatable flow rate selector, said inner rotatable housing having one or more scales imprinted thereon, each scale indicating the time remaining as a function of tank pressure at one of said plurality of flow rates; and
    an outer stationary housing covering at least a portion of said inner rotatable housing, and having an aperture for viewing at least a portion of a time remaining scale corresponding to a selected flow rate.

2. The time remaining assembly of claim 1 wherein the one or more scales are imprinted on said inner rotatable housing in a direction aligned with the cylindrical axis.

3. The time remaining display assembly of claim 1, wherein the pressure gauge has an indicator operatively aligned to the time remaining scale corresponding to a selected flow rate to indicate the time remaining in the tank at a pressure indicated by the pressure gauge.

4. The time remaining display assembly of claim 3, wherein the indicator points to the time remaining on the time remaining scale that corresponds to the pressure indicated by the pressure gauge.

5. The time remaining display assembly of claim 1, wherein a pressure scale is imprinted on the assembly in proximity to the one or more time scales.

6. The time remaining display assembly of claim 5, wherein a portion of the pressure scale corresponding to the tank pressure may be viewed through the outer stationary housing together with a portion of the time remaining scale that corresponds to the time remaining at the selected flow rate and tank pressure.

7. The time remaining display assembly of claim 1, wherein selection of a particular flow rate with the flow rate adjuster causes at least a portion of the corresponding time remaining scale to be displayed through said aperture.

8. The time remaining display assembly of claim 1, wherein the one or more scales are color-coded.

9. A regulator for a pressurized gas tank having a rotatable flow rate selector for selecting one of a plurality of flow rates, a pressure gauge, and an assembly for indicating the time remaining to supply gas from said tank at a selected flow rate, said assembly comprising:
    an inner rotatable housing having a cylindrical configuration mounted on said regulator and coupled to the rotatable flow rate selector, said inner rotatable housing having one or more scales imprinted thereon, each scale indicating the time remaining as a function of pressure at one of said plurality of flow rates; and
    an outer stationary housing covering at least a portion of said inner rotatable housing and having an aperture for viewing at least a portion of the time remaining scale corresponding to the selected flow rate.

10. The regulator of claim 9, wherein the one or more scales are imprinted on said inner rotatable housing in a direction aligned with the cylindrical axis.

11. The regulator of claim 9, wherein selection of a flow rate with the flow rate adjuster causes at least a portion of the corresponding time remaining scale to be displayed through said aperture.

12. The regulator of claim 9, wherein the pressure gauge has an indicator operatively aligned to the time scale corresponding to a selected flow rate to indicate the time remaining in the tank at a pressure indicated by the pressure gauge.

13. The regulator of claim 12, wherein the indicator points to the time remaining on the time remaining scale that corresponds to the pressure indicated by the pressure gauge.

14. The regulator of claim 9, further comprising a pressure scale imprinted in proximity to the one or more time scales, the pressure scale indicating an amount of pressure.

15. The regulator of claim 14, wherein a portion of the pressure scale corresponding to the tank pressure is visible through the outer stationary housing together with a portion of the time remaining scale that corresponds to the time remaining at the selected flow rate and tank pressure.

16. The regulator of claim 9, wherein the one or more time scales are color-coded.

* * * * *